Patented Jan. 10, 1928.

1,655,981

UNITED STATES PATENT OFFICE.

JAMES A. BARR, OF MOUNTPLEASANT, TENNESSEE, ASSIGNOR TO THE INTERNATIONAL AGRICULTURAL CORPORATION, OF NEW YORK, N. Y., A CORPORATION OF NEW YORK.

PROCESS OF MAKING BRIQUETTES CONTAINING PHOSPHATE ROCK.

No Drawing.   Application filed April 9, 1924.   Serial No. 705,403.

In the manufacture of phosphorus or phosphoric acid directly from phosphate rock by smelting in the electric or combustion furnace, the phosphate rock material is suitably ground and mixed with the required quantity of coke and silica to accomplish the reduction of the phosphorus to elemental form. In case phosphoric acid is sought directly, furnace conditions are regulated so as to oxidize the phosphorus formed to phosphoric acid anhydrid $P_2O_5$.

It has been proposed to briquette the phosphate rock, coke and silica mixture before introduction into the furnace with or without the use of an added binding material of some sort. I have now discovered that a superior product may be had if the briquettes so formed are heated to approximately read heat or higher whereupon it will be found that the particles comprising the briquette will be bound into a firm, coherent structure which is capable of being exposed to the weather for an indefinite time without undergoing disintegration or having its properties in any way impaired.

Preferably, I rely entirely upon the natural plasticity of the phosphate rock material, which is due largely to the presence of clayey material, to act as a binder, thereby eliminating the use of binding materials, such as pitch, sulphite liquor, etc., and furthermore producing a briquette which contains the maximum amount of the reacting materials.

In making my improved briquette I may proceed as follows:

I suitably prepare the phosphate rock material which may be the ordinary mine run phosphate, or the so-called pebble variety, by reducing it to a more or less uniform size, say to pass a one-sixteenth inch slot. I then mix the ground phosphate rock with a finely divided carbonaceous material, such as coal or coke and silica in the correct proportions for the phosphate reduction, using for the purpose an ordinary paddle mixer. In case the phosphate material runs high in silica, as is sometimes the case, no additional silica need be added. A typical composition would be as follows:

|   | Parts. |
|---|---|
| Phosphate rock (30% $P_2O_5$) | 62 |
| Pulverized coal | 20 |
| Silica including that silica contained in phosphate rock | 18 |
| Total | 100 |

The materials having been thoroughly mixed and a suitable amount of water added to give the proper consistency, the mixture is fed to a briquetting machine, such, for example, as a Belgium roll machine, and formed into briquettes under a pressure of about 8000 pounds per square inch. The green briquettes are then fed to a kiln of suitable type where they are subjected to a gradually increasing temperature until they are finally subjected to a cherry red to red heat.

Briquettes treated in this way will be found to have a structure strong and coherent enough to withstand all ordinary handling, and, in addition, they will be water-proof and may be stored without harm in the open for extended periods. If the final calcining temperature be high enough, the exterior surface of the briquettes may have a glazed appearance. Usually, the surface is similar to that of common red brick, hard baked but not fused.

In the illustrative example above I have specified pulverized coal as the carbonaceous material used instead of the customary coke, the former material having the advantage that the volatile matter produced burns in the kiln and furnishes additional heat in the calcining. Equally satisfactory briquettes may however be produced using coke. While I have described my invention with particular reference to the production of a briquette containing carbon and silica, it will be understood that a water-proof briquette of phosphate rock material without these additions is within the purview of my invention. While ordinarily, the use of foreign binding materials will not be necessary, these may be used in special cases, and particularly where the original material has insufficient plasticity small amounts of clay may be added.

I claim:

The steps in the process of making a substantially water-proof briquette which comprise mixing about six parts of ground phosphate rock, two parts of pulverized coal and two parts of silica, forming the mixture into a briquette and heating the briquette to approximately red head.

JAMES A. BARR.

CERTIFICATE OF CORRECTION.

Patent No. 1,655,981. Granted January 10, 1928, to

JAMES A. BARR.

It is hereby certified that error appears in the printed specification of the above numbered patent requiring correction as follows: Page 2, line 14, last word of claim, for the word "head" read "heat"; and that the said Letters Patent should be read with this correction therein that the same may conform to the record of the case in the Patent Office.

Signed and sealed this 13th day of March, A. D. 1928.

Seal.

M. J. Moore,
Acting Commissioner of Patents.